(12) United States Patent
Umeki (10) Patent No.: US 11,458,917 B2
(45) Date of Patent: Oct. 4, 2022

(54) SENSOR ATTACHMENT STRUCTURE

(71) Applicant: Toyota Jidosha Kabushiki Kaisha, Toyota (JP)

(72) Inventor: Yoshinari Umeki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 262 days.

(21) Appl. No.: 16/846,700

(22) Filed: Apr. 13, 2020

(65) Prior Publication Data

US 2021/0001794 A1   Jan. 7, 2021

(30) Foreign Application Priority Data

Jul. 2, 2019 (JP) .............................. JP2019-123943

(51) Int. Cl.
*B60R 19/48* (2006.01)
*G01S 13/931* (2020.01)

(52) U.S. Cl.
CPC .. *B60R 19/483* (2013.01); *G01S 2013/93274* (2020.01)

(58) Field of Classification Search
CPC ......... B60R 19/483; G01S 2013/93274; G01S 13/931; G01S 15/931; G01S 2015/937
See application file for complete search history.

(56) References Cited

U.S. PATENT DOCUMENTS

| | | | | |
|---|---|---|---|---|
| 9,673,517 B2* | 6/2017 | Tran | .......................... | H01Q 1/42 |
| 10,073,178 B2* | 9/2018 | Hara | ...................... | G01S 7/4813 |
| 10,144,424 B2* | 12/2018 | Hara | ...................... | G01S 13/931 |
| 11,046,255 B2* | 6/2021 | Miwa | ..................... | B60R 19/483 |
| 2006/0043711 A1 | 3/2006 | Kuze et al. | | |
| 2012/0154587 A1 | 6/2012 | Hwang | | |
| 2014/0070982 A1* | 3/2014 | Inada | ...................... | B60R 19/483 |
| | | | | 342/385 |
| 2014/0111950 A1* | 4/2014 | Yamasaki | ........... | B60R 16/0239 |
| | | | | 361/747 |
| 2014/0158731 A1 | 6/2014 | Squire et al. | | |
| 2016/0282155 A1* | 9/2016 | Hara | ...................... | G01D 11/30 |
| 2016/0297437 A1* | 10/2016 | Hara | ...................... | G01S 7/4813 |
| 2017/0297521 A1 | 10/2017 | Sugie et al. | | |
| 2019/0162845 A1* | 5/2019 | Yasui | ....................... | G01S 15/02 |
| 2019/0256009 A1* | 8/2019 | Miwa | ..................... | G01S 13/931 |
| 2020/0156576 A1* | 5/2020 | Kataoka | ................. | B62D 25/16 |
| 2020/0158828 A1* | 5/2020 | Kataoka | ................. | B60R 19/483 |
| 2020/0172020 A1* | 6/2020 | Nakayama | .............. | B60R 11/00 |
| 2021/0001794 A1* | 1/2021 | Umeki | .................... | B60R 11/00 |
| 2021/0148737 A1* | 5/2021 | Yamaji | .................... | G01S 7/027 |

FOREIGN PATENT DOCUMENTS

JP   2006-062542 A   3/2006
JP   2017-193223 A   10/2017

* cited by examiner

*Primary Examiner* — Gregory A Blankenship
(74) *Attorney, Agent, or Firm* — Dinsmore & Shohl LLP (57) ABSTRACT

The sensor attachment structure includes: an attachment recess formed by causing a part of an exterior panel of a vehicle to be depressed toward an inside of the vehicle; a surrounding information sensor that detects surrounding information of the vehicle, at least a part of the surrounding information sensor being disposed further inside the vehicle than the attachment recess; a sensor clip that attaches the surrounding information sensor to the exterior panel from an outside of the vehicle; and a cover body that covers and hides the sensor clip attached to the attachment recess, the cover body being attached to the exterior panel.

18 Claims, 7 Drawing Sheets

SENSOR ATTACHMENT STRUCTURE

CROSS-REFERENCE TO RELATED APPLICATIONS

This application claims priority to Japanese Patent Application No. 2019-123943 filed on Jul. 2, 2019, which is incorporated herein by reference in its entirety including the specification, drawings and abstract.

BACKGROUND

1. Technical Field

The present specification discloses a structure in which a surrounding information sensor that detects surrounding information of a vehicle is attached to an exterior panel of the vehicle.

2. Description of Related Art

In recent years, a vehicle having a driving assistance function or an autonomous driving function in which a part or all of a dynamic driving task of the vehicle is automatically performed on the vehicle side has been known. Such a vehicle usually has a surrounding information sensor that detects surrounding information of the vehicle. The surrounding information sensor may be, for example, a camera that captures an image of the periphery of the vehicle, a laser sensor that detects an object using radio waves, or an optical sensor that detects an object using light. There are cases where a surrounding information sensor is attached to an exterior panel such as a fender panel.

For example, Japanese Unexamined Patent Application Publication No. 2017-193223 (JP 2017-193223 A) discloses a technique of attaching a surrounding information sensor to the inside of a fender panel in a vehicle-width direction. In JP 2017-193223 A, a bracket is disposed inside the fender panel in the vehicle-width direction (inside the vehicle), and the surrounding information sensor is attached to the bracket.

SUMMARY

In case of a configuration in which a surrounding information sensor is attached to a bracket or the like provided inside a vehicle as in JP 2017-193223 A, an operation of attaching the sensor needs to be performed from the inside of the vehicle, resulting in poor operation properties.

Therefore, the present specification discloses a sensor attachment structure capable of simplifying an operation of attaching a surrounding information sensor to an exterior panel.

An aspect of the present disclosure relates to a sensor attachment structure. The sensor attachment structure includes: an attachment recess formed by causing a part of an exterior panel of a vehicle to be depressed toward an inside of the vehicle; a surrounding information sensor configured to detect surrounding information of the vehicle, at least a part of the surrounding information sensor being disposed further inside the vehicle than the attachment recess; an attachment member configured to attach the surrounding information sensor to the exterior panel from an outside of the vehicle; and a cover body configured to cover and hide the attachment member attached to the attachment recess, the cover body being attached to the exterior panel.

With this configuration, the surrounding information sensor can be attached by an operation from the outside of the vehicle, so that the operation of attaching the sensor can be simplified. In addition, since the attachment member attached from the outside of the vehicle is covered and hidden by the cover body, the design is not impaired.

In the sensor attachment structure according to the aspect of the present disclosure, a panel-side opening that exposes at least a part of the surrounding information sensor may be formed in a depression direction bottom surface of the attachment recess.

By providing the panel-side opening, transmission and reception of electromagnetic waves or ultrasonic waves for detection by the sensor can be performed favorably, and a decrease in detection accuracy can be suppressed.

In the sensor attachment structure according to the aspect of the present disclosure, a cover-side opening that exposes at least a part of the surrounding information sensor may be formed in a portion of the cover body that faces the panel-side opening.

By providing not only the panel-side opening but also the cover-side opening, transmission and reception of electromagnetic waves or ultrasonic waves for detection by the sensor can be performed more favorably, and a decrease in detection accuracy can be suppressed more reliably.

In the sensor attachment structure according to the aspect of the present disclosure, a corner hole that is a through-hole may be formed in at least one corner of the attachment recess.

By providing the through-hole (corner hole) at the corner of the attachment recess, distortion generated in a process of forming the attachment recess can be absorbed, and quality deterioration such as surface distortion of the exterior panel can be suppressed.

In the sensor attachment structure according to the aspect of the present disclosure, one of the surrounding information sensor and the attachment recess may have a locking claw protruding toward the other, and the other of the surrounding information sensor and the attachment recess may have a locking hole into which the locking claw is inserted and caught.

When the locking claw is caught in the locking hole to temporarily place the surrounding information sensor and the surrounding information sensor is attached by the attachment member, an operation of attaching the surrounding information sensor can be further simplified.

In the sensor attachment structure according to the aspect of the present disclosure, the cover body may be fastened to a depression direction bottom surface of the attachment recess by a cover clip protruding from a rear surface of the cover body.

When the cover body is attached to the attachment recess with the cover clip protruding from the rear surface of the cover body, the cover clip is not visible from the outside of the vehicle, so that deterioration of the design of the cover clip can be suppressed.

With the sensor attachment structure according to the aspect of the present disclosure the sensor attachment structure disclosed in this specification, the operation of attaching the surrounding information sensor to the exterior panel can be simplified.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
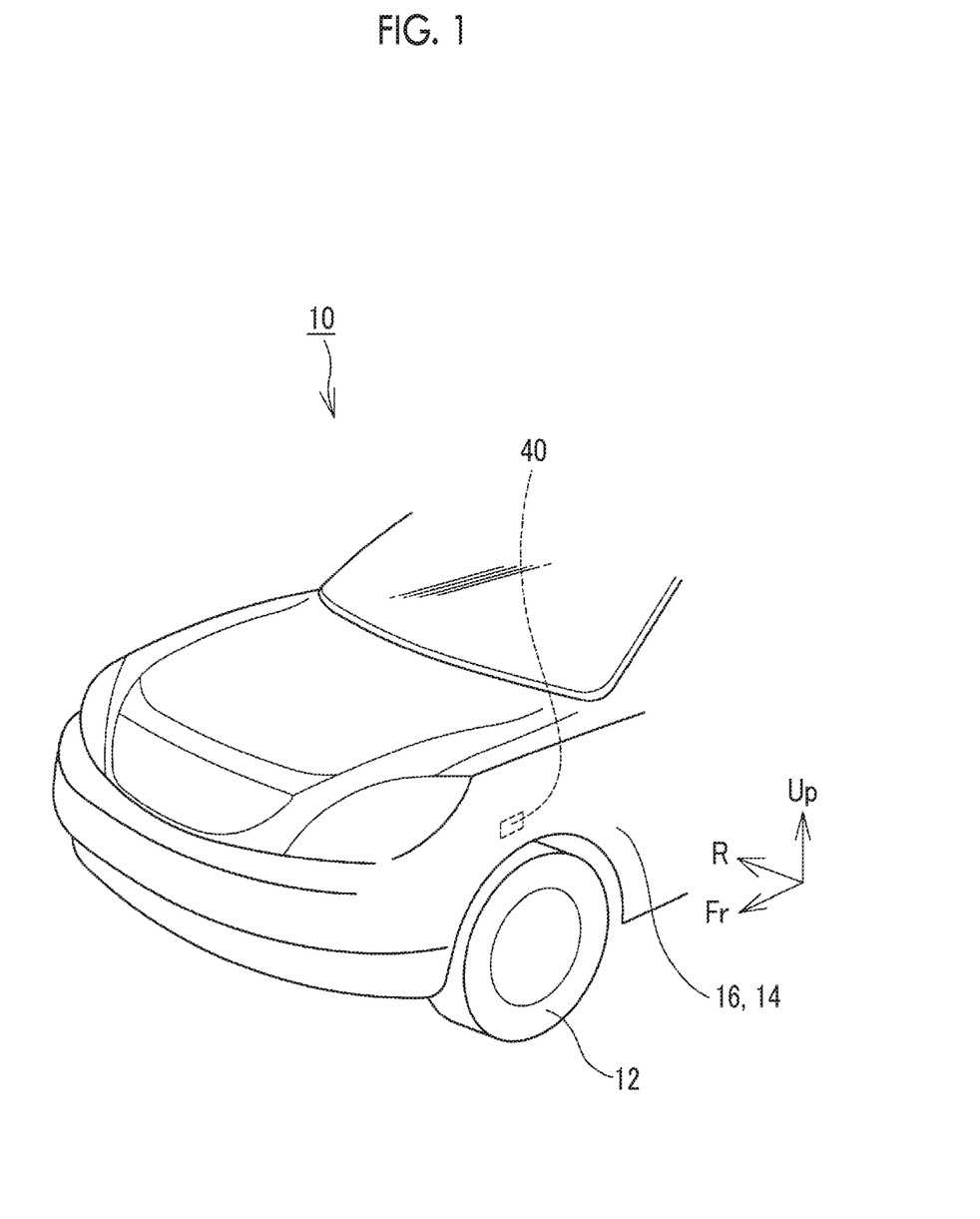
FIG. 1 is a perspective view of a vehicle viewed from a front.

Hereinafter, a sensor attachment structure will be described with reference to the drawings. FIG. 1 is a perspective view of a vehicle 10 viewed from the front. In the following drawings, "Fr", "Up", and "R" indicate the front of the vehicle, the upper side of the vehicle, and the right side of the vehicle, respectively.

The vehicle 10 has a driving assistance function or an autonomous driving function. Here, the "driving assistance" is a function in which a part of a dynamic driving task is performed by the vehicle 10, and means, for example, Level 1 or Level 2 defined by the Society of Automotive Engineers (SAE). In Level 1, the vehicle 10 supports either a steering operation or acceleration/deceleration. In Level 2, the vehicle 10 supports driving while coordinating both a steering operation and acceleration/deceleration. The "autonomous driving" is a function in which almost all of the dynamic driving task is performed by the vehicle 10, and means, for example, any one of Level 3 to Level 5 defined by SAE. Level 3 is a driving mode in which all of the dynamic driving task is automated in a specific place such as an expressway, but an operation by a driver is needed in an emergency. Level 4 is a driving mode in which all of the dynamic driving task is automated solely in a specific place, and an emergency response is also automatically processed. Level 5 is a driving mode in which autonomous driving can be performed under almost all conditions without restriction on places and the like, and means so-called "full autonomous driving".

In order to realize driving assistance or autonomous driving, a surrounding information sensor 40 is mounted in the vehicle 10. The surrounding information sensor 40 is a sensor that detects the surrounding states of the vehicle 10. The surrounding information sensor 40 may be, for example, a camera that includes an image sensor (such as a CCD sensor or a CMOS sensor) and captures an image of the surroundings of the vehicle 10. Alternatively, the surrounding information sensor 40 may be a sensor that detects an object around the vehicle by transmitting and receiving electromagnetic waves. Examples of the sensor include a millimeter wave radar using millimeter waves, an infrared laser radar using an infrared laser, and a lidar using laser light emitted in a pulse shape. Also, the surrounding information sensor 40 may be a sensor that detects an object around the vehicle 10 by transmitting and receiving ultrasonic waves, for example, a clearance sonar. The number of surrounding information sensors 40 mounted in one vehicle 10 and the number of kinds thereof are not particularly limited as long as the number thereof is one or more and the number of kinds thereof is one or more.

In this example, as illustrated in FIG. 1, one surrounding information sensor 40 is attached to a fender panel 16. The fender panel 16 forms a part of the exterior panel 14 and is a sheet metal member obtained by forming a metal panel. The fender panel 16 is a side surface of the vehicle 10 and is located above a front wheel 12. The surrounding information sensor 40 is disposed inward of the fender panel 16 in a vehicle-width direction (inside the vehicle, the R direction in the illustrated example).

Figure 2:
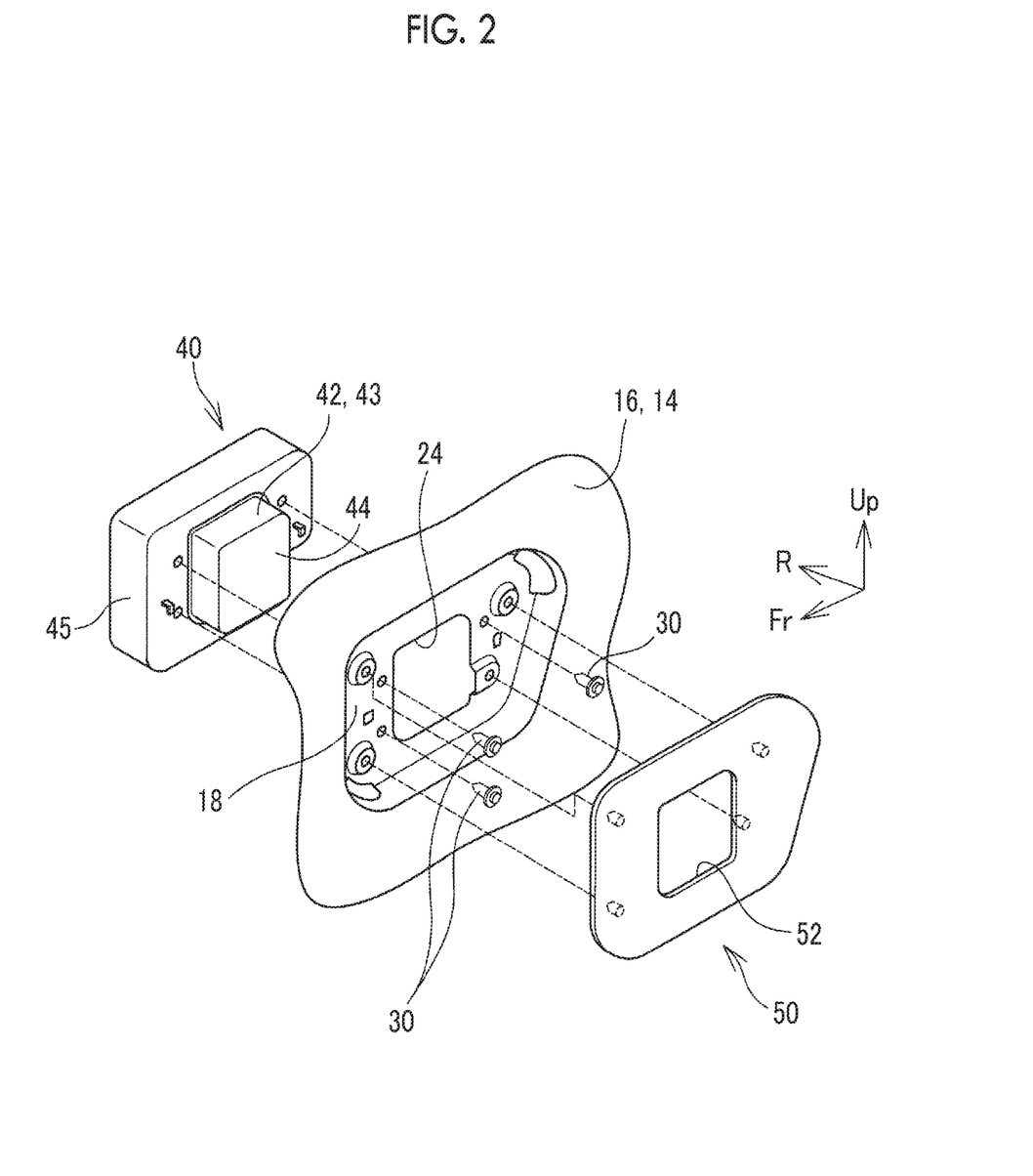
FIG. 2 is an exploded perspective view illustrating a form of attachment of a surrounding information sensor.
Figure 3:
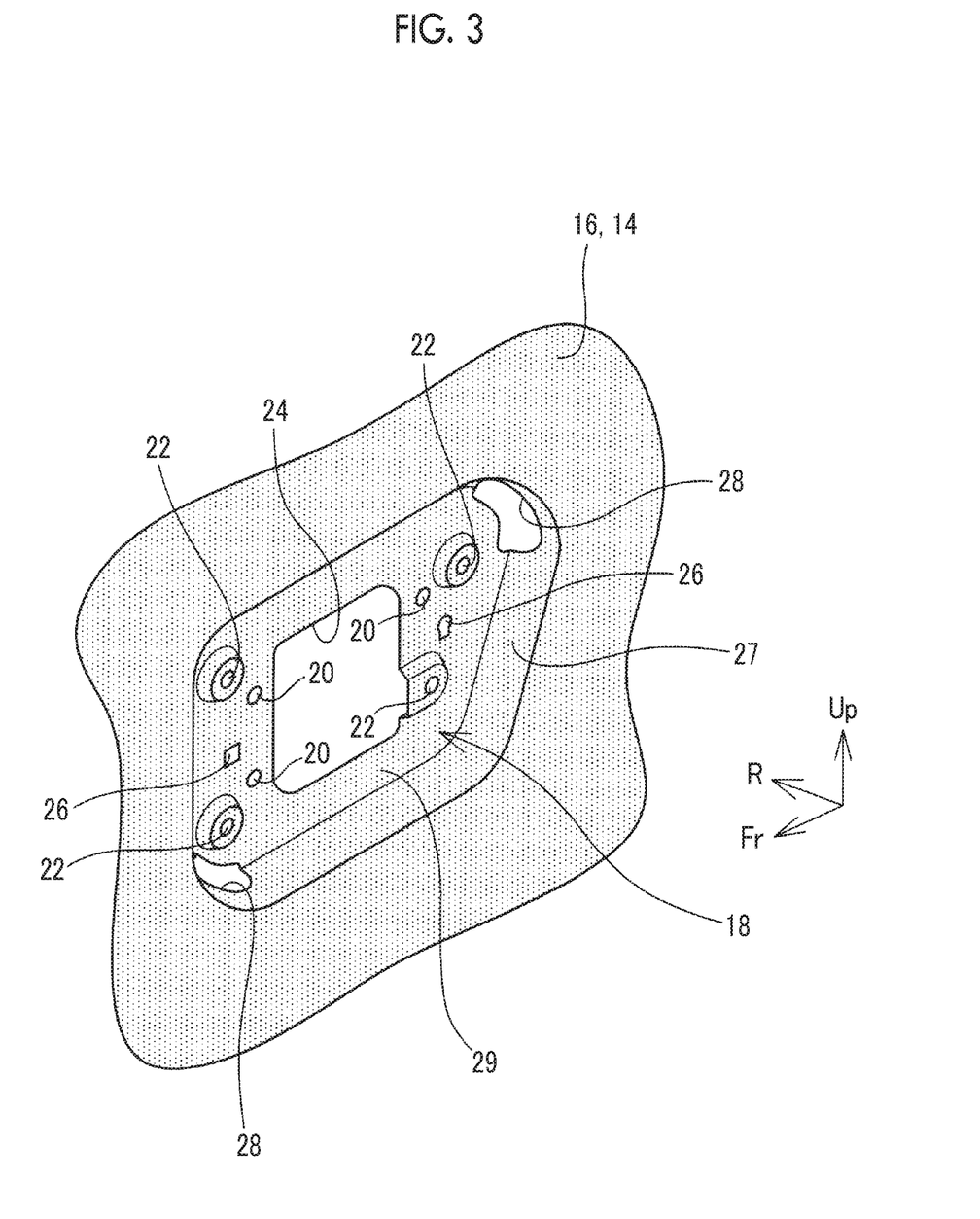
FIG. 3 is a perspective view of an attachment recess.
Figure 4:
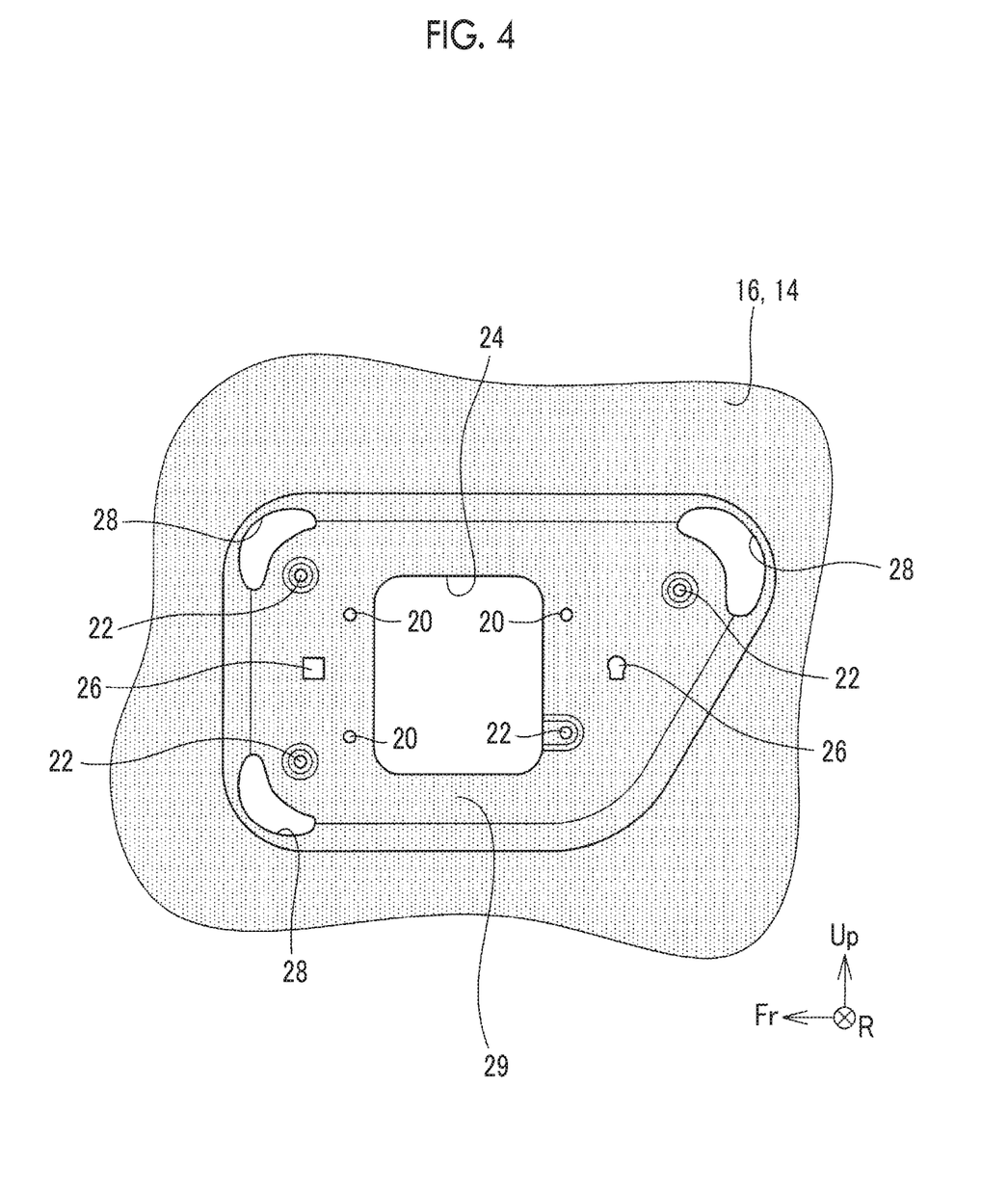
FIG. 4 is a view of the attachment recess viewed from a side.
Figure 5:
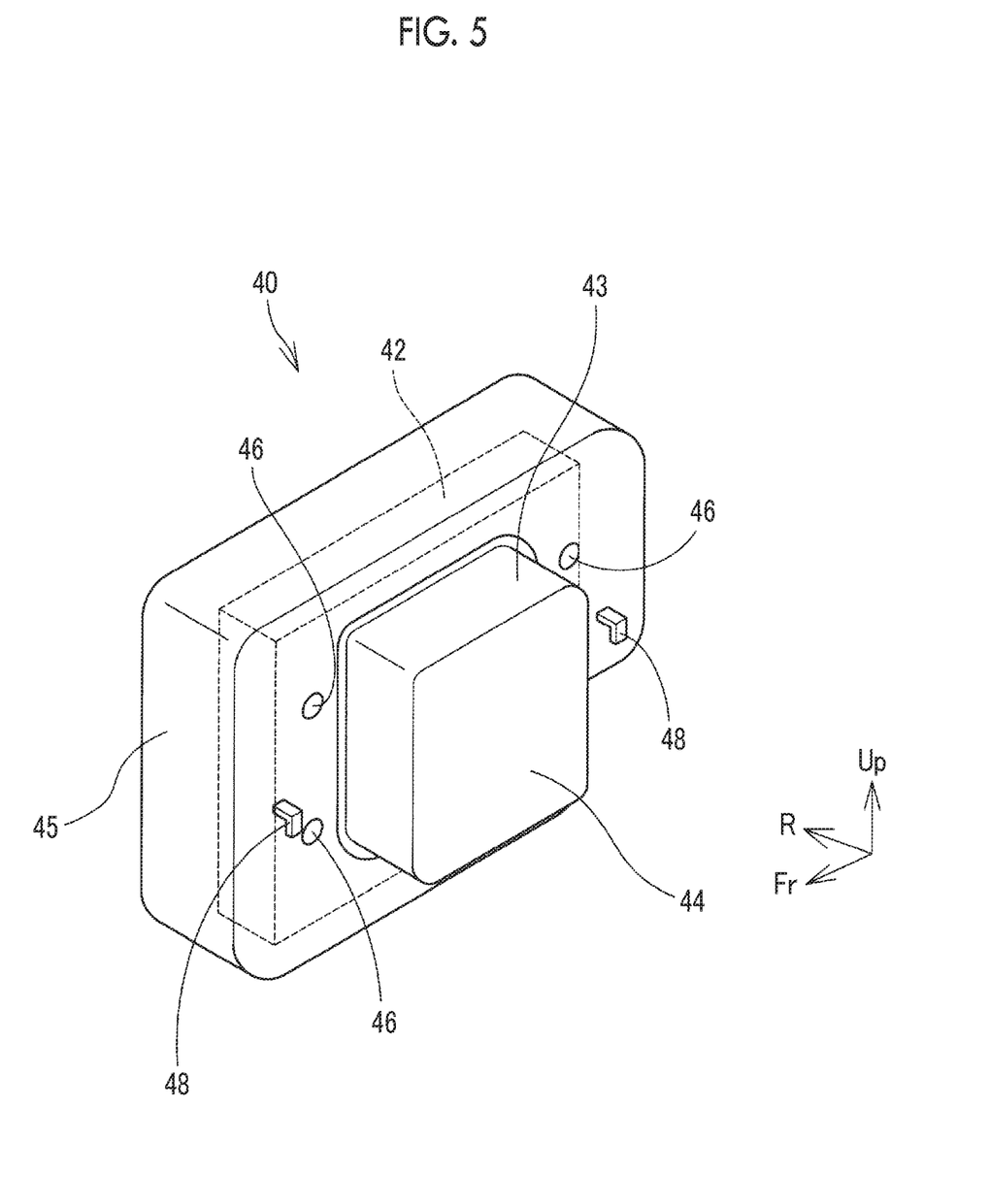
FIG. 5 is a perspective view of the surrounding information sensor.
Figure 6:
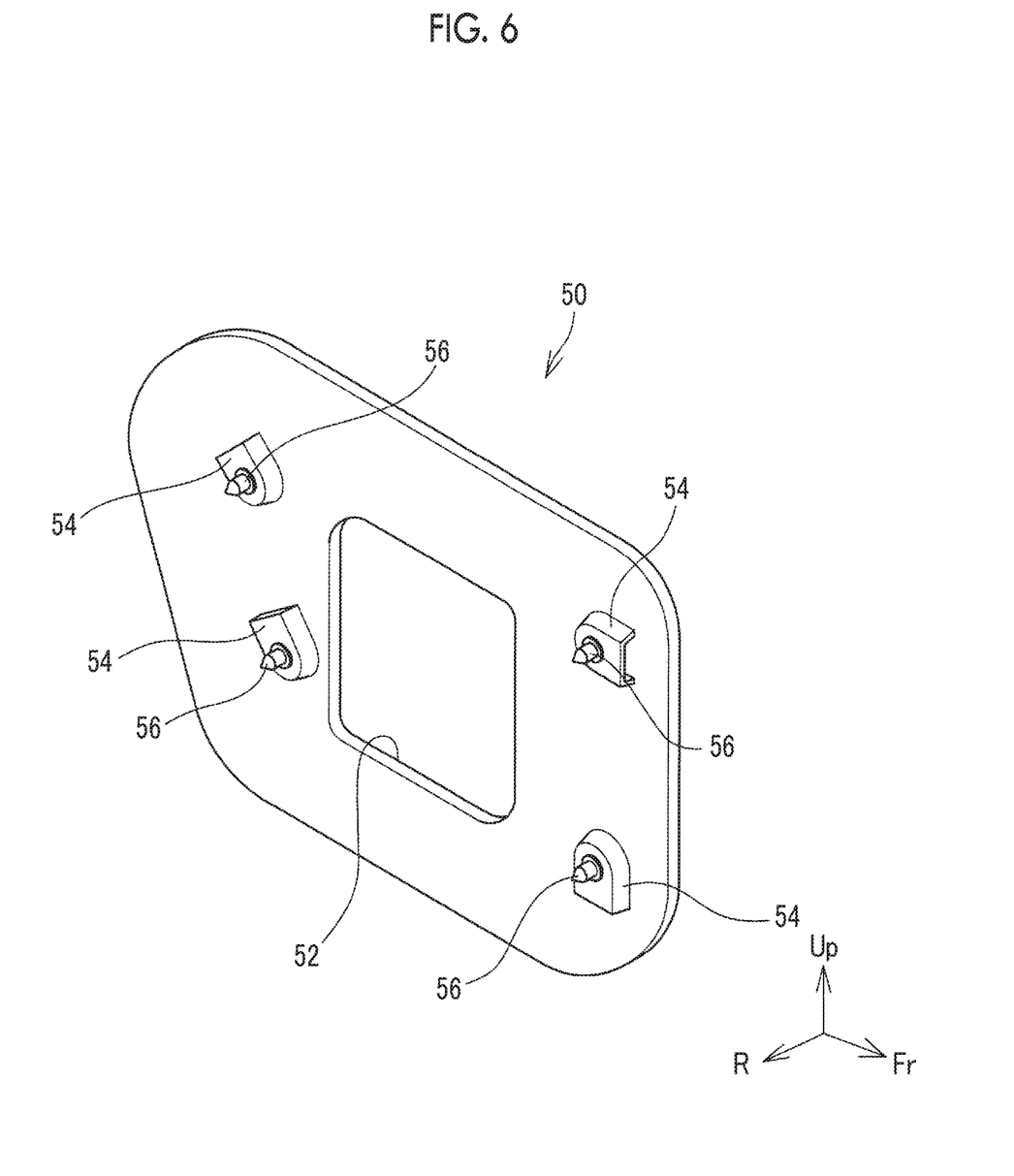
FIG. 6 is a perspective view of a cover body viewed from a rear side.

The attachment of the surrounding information sensor 40 will be described with reference to FIGS. 2 to 6. FIG. 2 is an exploded perspective view illustrating a form of the attachment of the surrounding information sensor 40. FIG. 3 is a perspective view of an attachment recess 18, and FIG. 4 is a view of the attachment recess 18 viewed from a side (R direction). FIG. 5 is a perspective view of the surrounding information sensor 40, and FIG. 6 is a perspective view of a cover body 50 viewed from a rear side. In FIGS. 3 and 4, the fender panel 16 is hatched in black to clarify the positions of openings and holes.

A part of the fender panel 16 (exterior panel 14) to which the surrounding information sensor 40 is attached is provided with the attachment recess 18 formed by causing the fender panel 16 to be depressed toward the inside of the vehicle (inward in the vehicle-width direction). The attachment recess 18 is substantially quadrangular as illustrated in FIGS. 3 and 4. A substantially rectangular panel-side opening 24 is formed at the center of a depression direction bottom surface 29 of the attachment recess 18. The panel-side opening 24 is provided for allowing a protruding portion 43 of a sensor main body 42, which will be described later, to pass therethrough to expose a detection surface 44 to the outside.

In the depression direction bottom surface 29, sensor fastening holes 20, cover fastening holes 22, and locking holes 26 are further formed. The sensor fastening holes 20 are circular holes, and three sensor fastening holes 20 are formed in the periphery of the panel-side opening 24. The sensor fastening hole 20 is a fastening hole for attaching the surrounding information sensor 40 to the exterior panel 14, and is a hole into which a sensor clip 30 (see FIG. 2) is inserted. The sensor clip 30 is an attachment member for attaching the surrounding information sensor 40 to the exterior panel 14. The sensor clip 30 has, for example, a wide flange and a main body shaft extending from the flange, and the main body shaft expands and contracts in a radial direction and is firmly fixed to a clip hole 46 of the surrounding information sensor 40.

The cover fastening holes 22 are round holes provided at locations closer to the panel-side opening 24 than the four corners of the attachment recess 18. The location where each cover fastening hole 22 is formed protrudes in an island shape toward the outside of the vehicle. The cover fastening holes 22 are fastening hole for attaching the cover body 50, which will be described later, to the exterior panel 14, and are holes into which cover clips 56 (see FIG. 6) are inserted and engaged.

A total of two locking holes 26 are formed respectively on both sides of the panel-side opening 24 in a horizontal direction. The locking holes 26 are holes into which locking claws 48 (see FIG. 5), which will be described later, are inserted and caught. In this example, one locking hole 26 has a substantially rectangular shape, and the other locking hole 26 has a keyhole shape in which a rectangle is connected to the lower side of a circle. The arrangement heights of the two locking holes 26 are substantially the same. The surrounding information sensor 40 is temporarily placed by causing the locking claws 48 to be caught in the locking holes 26, and this will be described later.

Corner holes 28 are further formed at the corners of the attachment recess 18 (see FIG. 3). Each corner hole 28 is a relatively large hole that spans the depression direction bottom surface 29 and a peripheral surface 27 of the attachment recess 18. By forming the corner holes 28 at the corners of the attachment recess 18, surface distortion of the corners of the attachment recess 18 can be absorbed by the corner holes 28. Accordingly, the distortion of the surface of the fender panel 16 can be reduced, and good surface quality can be secured.

As described above, the surrounding information sensor 40 is a sensor that detects the surrounding states of the vehicle 10. As illustrated in FIG. 1, the surrounding information sensor 40 is disposed inward of the attachment recess 18 (exterior panel 14) in the vehicle-width direction and attached to the exterior panel 14. As illustrated in FIG. 5, the surrounding information sensor 40 is roughly divided into the sensor main body 42 and a sensor frame 45 that holds the sensor main body 42. At the center of the sensor main body 42, the protruding portion 43 protruding outward in the vehicle-width direction is present, and the tip end surface of the protruding portion 43 serves as the detection surface 44 that transmits and receives electromagnetic waves or ultrasonic waves for detection.

The sensor frame 45 holds the sensor main body 42 in a state where the protruding portion 43 is exposed to the outside. Three clip holes 46 and two locking claws 48 are provided in a vehicle-width direction outer end surface of the sensor frame 45. The clip holes 46 are provided at positions opposite to the sensor fastening holes 20 in a state where the protruding portion 43 passes through the panel-side opening 24. Each clip hole 46 is a hole into which the sensor clip 30 is inserted and engaged.

The locking claw 48 is a substantially L-shaped projection that extends outward in the vehicle-width direction from the vehicle-width direction outer end surface of the sensor frame 45 and then extends downward. The locking claws 48 are provided at positions substantially opposite to the locking holes 26 in the state where the protruding portion 43 passes through the panel-side opening 24. The dimension of the locking claw 48 in an up-down direction is smaller than the dimension of the locking hole 26 in the up-down direction such that the locking claw 48 can pass through the locking hole 26. The dimension of the locking claw 48 in the horizontal direction is smaller than the dimension of the lower end edge of the locking hole 26 in the horizontal direction such that when the locking claw 48 is inserted into the locking hole 26, the locking claw 48 is caught in the lower end edge of the locking hole 26 and does not fall.

Since the locking claw 48 is caught in the locking hole 26, the surrounding information sensor 40 is temporarily placed at a predetermined height position. In a state where the surrounding information sensor 40 is temporarily placed, the sensor clips 30 are fitted into the sensor fastening holes 20 and the clip holes 46 from the outside of the vehicle, whereby the surrounding information sensor 40 is fastened to the exterior panel 14. The depth of the attachment recess 18 is sufficiently larger than the height of the head of the sensor clip 30 so that the head of the sensor clip 30 does not protrude outward from the attachment recess 18.

The cover body 50 is a plate-like member that covers and hides the sensor clips 30 attached to the attachment recess 18. The cover body 50 has an outer shape that is substantially the same as the outer shape of the attachment recess 18, or slightly offset inward from the outer shape of the attachment recess 18. A cover-side opening 52 for exposing the detection surface 44 of the surrounding information sensor 40 to the outside is formed at the center of the cover body 50 at a location directly opposite to the panel-side opening 24. Furthermore, as illustrated in FIG. 2, the outer surface of the cover body 50 is a smooth surface having no irregularities, and has almost the same texture as the outer surface of the fender panel 16. When the cover body 50 is attached to the attachment recess 18, the outer surface of the cover body 50 is smoothly connected to the outer surface of the fender panel 16 surrounding the periphery of the cover body 50.

As illustrated in FIG. 6, four pedestal portions 54 are formed on the inner surface of the cover body 50 so as to protrude. Furthermore, the cover clip 56 stands on each of the pedestal portions 54 toward the inside in the vehicle-width direction. The cover clip 56 is a clip that is inserted into and engaged with the cover fastening hole 22 of the attachment recess 18. Therefore, the cover clip 56 is provided at a position opposite to the cover fastening hole 22. The height of the pedestal portion 54 is set such that the outer surface of the cover body 50 subjected to clip fastening is smoothly connected to the outer surface of the fender panel 16 in the periphery of the cover body 50. The cover body 50 is fitted to the attachment recess 18 from the outside of the vehicle 10 so as to cause the cover clips 56 to be fitted into the cover fastening holes 22, thereby being attached to the attachment recess 18.

Next, a procedure of the attachment of the surrounding information sensor 40 in this example will be described. In order to attach the surrounding information sensor 40 to the fender panel 16, first, the surrounding information sensor 40 is brought inside the fender panel 16 in the vehicle-width direction. Subsequently, the protruding portion 43 of the surrounding information sensor 40 is caused to pass through the panel-side opening 24, and the locking claws 48 are caught in the locking holes 26. When the locking claws 48 are caught in the locking holes 26, an operator inserts the three sensor clips 30 into the sensor fastening holes 20 and the clip holes 46 from the outside of the vehicle 10 so as to be engaged. The fastening operation of the sensor clips 30 is an operation performed from the outside of the vehicle and thus can be performed more easily than a case where the operation is performed from the inside of the vehicle. At this time, since the surrounding information sensor 40 is temporarily placed by the locking claws 48, the operator can release hands from the surrounding information sensor 40 as needed. As a result, both hands can be used freely as needed, so that the operation properties of the operator can be further improved.

When the surrounding information sensor 40 can be fastened to the attachment recess 18, subsequently, the cover body 50 is fastened to the attachment recess 18. Specifically, the operator fits the cover body 50 into the attachment recess 18 from the outside of the vehicle 10 such that the cover clips 56 of the cover body 50 are inserted into the cover fastening holes 22 of the attachment recess 18. Then, the cover clips 56 are inserted into the cover fastening holes 22 and engaged therewith, whereby the cover body 50 is attached to the attachment recess 18.

The operation of fastening the cover body 50 is also an operation performed from the outside of the vehicle and thus can be performed more easily than a case where the operation is performed from the inside of the vehicle. Also, by attaching the cover body 50, the head of the sensor clip 30 and the locking claw 48 exposed in the attachment recess 18 are covered and hidden by the cover body 50, so that the design of the vehicle 10 is improved. On the other hand, the detection surface 44 of the surrounding information sensor 40 is exposed to the outside via the panel-side opening 24 and the cover-side opening 52. As a result, electromagnetic waves or ultrasonic waves for detection can be transmitted and received satisfactorily, and a decrease in the accuracy of the surrounding information sensor 40 can be suppressed.

As is clear from the above description, in this example, both the surrounding information sensor 40 and the cover body 50 can be attached by access from the outside of the vehicle 10. As a result, the fastening operation of the surrounding information sensor 40 and the like can be simplified. On the other hand, the heads of the clips 30, 56 used for fastening are covered and hidden by the cover body 50, so that deterioration of the design of the vehicle 10 can be effectively suppressed.

Figure 7:
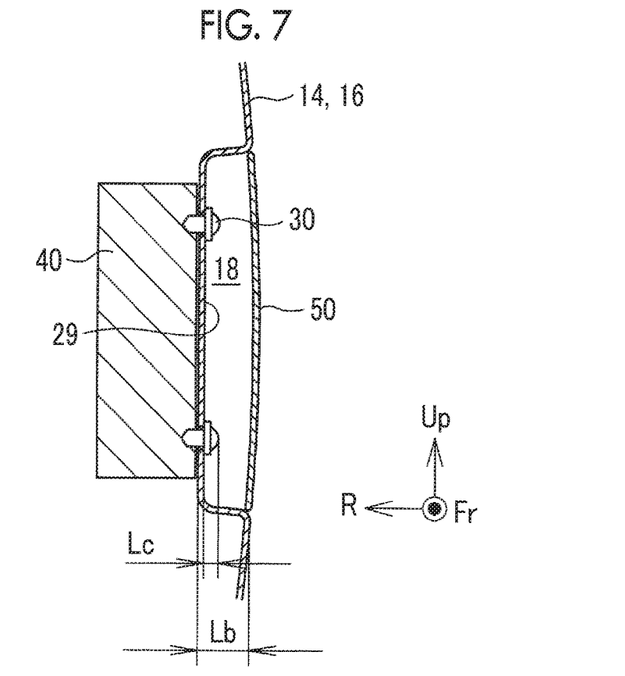
FIG. 7 is a schematic cross-sectional view illustrating a form in which a surrounding information sensor is disposed inward of the attachment recess in a vehicle-width direction.
Figure 8:
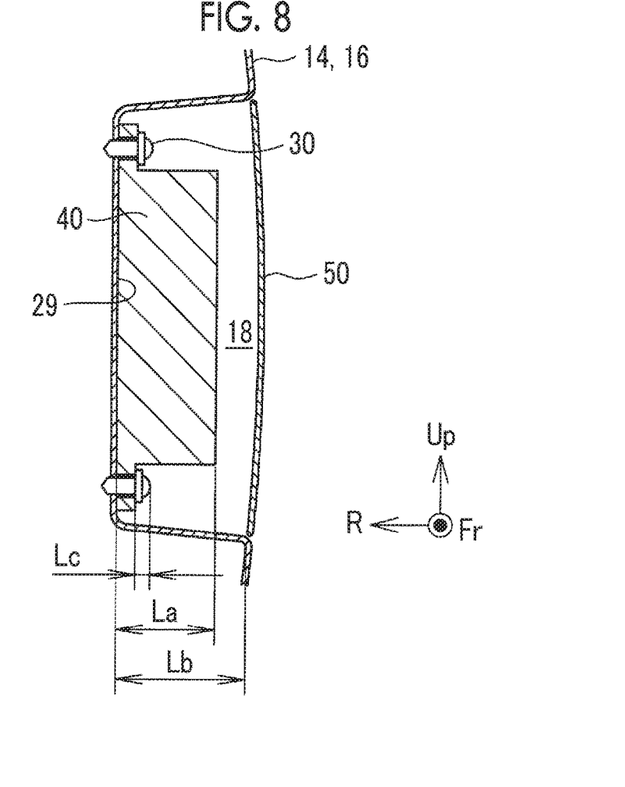
FIG. 8 is a schematic cross-sectional view illustrating a form in which the surrounding information sensor is disposed in the attachment recess.

Furthermore, in this example, the surrounding information sensor 40 is disposed inward of the attachment recess 18 in the vehicle-width direction. With this configuration, the depth of the attachment recess 18 can be reduced, and the distortion of the exterior panel 14 in the periphery of the attachment recess 18 can be reduced. This will be described with reference to FIGS. 7 and 8. FIG. 7 is a schematic cross-sectional view illustrating a form in which the surrounding information sensor 40 is disposed inward of the attachment recess 18 in the vehicle-width direction as in this example, and FIG. 8 is a schematic cross-sectional view illustrating a form in which the surrounding information sensor 40 is disposed in the attachment recess 18.

In the above description, the surrounding information sensor 40 is disposed further inside the vehicle 10 than the attachment recess 18 as illustrated in FIG. 7. However, as illustrated in FIG. 8, it is conceivable to dispose the surrounding information sensor 40 in the attachment recess 18 (further outside the vehicle than the bottom surface 29). Even in this case, the sensor clip 30 can be inserted from the outside of the vehicle, so that the operation properties are not much different from the case of FIG. 7. However, in a case where the surrounding information sensor 40 is disposed in the attachment recess 18, a depth Lb of the attachment recess 18 needs to be larger than a thickness La of the surrounding information sensor 40. The thickness La of the surrounding information sensor 40 varies depending on the kind of the sensor and the like, but is generally sufficiently larger than a head height Lc of the sensor clip 30.

Here, in general, the attachment recess 18 is formed by a drawing process. In a case where the depth Lb of the attachment recess 18 is large, the attachment recess 18 cannot be formed by a single drawing process, and needs to be gradually deepened by a plurality of drawing processes, resulting in an increase in the number of manufacturing processes of the exterior panel 14. In a case where the depth Lb of the attachment recess 18 is excessively large, cracking of the material and surface distortion are likely to occur even when the drawing process is divided into a plurality of drawing processes, and there is concern that deterioration of the surface quality of the exterior panel 14 may be caused.

On the other hand, as illustrated in FIG. 7, in a case where the surrounding information sensor 40 is disposed further inside the vehicle 10 than the bottom surface 29 of the attachment recess 18, the depth Lb of the attachment recess 18 may be greater than the head height Lc of the sensor clip 30. As described above, since the head height Lc of the sensor clip 30 is sufficiently smaller than the thickness La of the surrounding information sensor 40, the depth Lb of the attachment recess 18 can be reduced with the configuration of FIG. 7. As a result, the number of drawing processes for forming the attachment recess 18 can be reduced. In addition, since cracks and surface distortion due to the drawing processes are reduced, the surface quality of the exterior panel 14 can be kept high. Furthermore, as described above, in this example, since the corner holes 28 that absorb the distortion of the surface are formed at the corners of the attachment recess 18, the surface quality can be kept higher.

The configuration that has been described above is merely an example, and the other configurations may be changed as long as the surrounding information sensor 40 disposed further inside the vehicle than the attachment recess 18 is attached to the exterior panel 14 from the outside of the vehicle by the attachment member and the attachment member is covered and hidden by the cover body 50 attached to the exterior panel 14. For example, the number and positions of the fastening holes 20, 22 and the locking holes 26 may be changed as appropriate. Furthermore, in this example, although the clip is used as the attachment member for attaching the surrounding information sensor 40, another attachment member may be used. For example, bolts, rivets, or the like may be used as attachment members.

Moreover, in this example, although the locking claws 48 are provided in the surrounding information sensor 40 and the locking holes 26 are provided in the attachment recess 18, this may be reversed. That is, a locking claw protruding from the bottom surface 29 of the attachment recess 18 toward the inside of the vehicle may be formed, and the surrounding information sensor 40 may be provided with a locking hole in which the locking claw is caught. In some cases, the locking claw 48 and the locking hole 26 may be omitted.

The cover body 50 may also be attached by units other than the clip standing on the cover body 50. For example, an engagement claw that is engaged with the peripheral edge of the attachment recess 18 may be formed on the peripheral edge of the cover body 50, and accordingly the cover body 50 may be attached to the attachment recess 18.

Furthermore, as long as sufficient detection accuracy can be secured, the panel-side opening 24 and the cover-side opening 52 may be omitted, and the cover-side opening 52 may cover the entire surface of the attachment recess 18. With this configuration, the surrounding information sensor 40 is hardly noticeable, and the design of the vehicle 10 is further improved.

In addition, in the above description, the fender panel 16 has been described as an example of the exterior panel 14 to which the surrounding information sensor 40 is attached. However, the exterior panel 14 is not limited to the fender panel 16 as long as the exterior panel 14 is a panel that forms the outer surface of the vehicle 10, and the exterior panel 14 may be another panel. For example, the surrounding information sensor 40 may be attached to a panel provided on the front surface or rear surface of the vehicle 10, a rocker panel provided below the side door, or the like.

What is claimed is:
1. A sensor attachment structure comprising:
an attachment recess formed by causing a part of an exterior panel of a vehicle to be depressed toward an inside of the vehicle;

a surrounding information sensor configured to detect surrounding information of the vehicle, at least a part of the surrounding information sensor being disposed further inside the vehicle than the attachment recess, a clip hole formed in the surrounding information sensor;

an attachment member configured to attach the surrounding information sensor to the exterior panel from an outside of the vehicle, the attachment member insertable and engageable with the clip hole; and a cover body configured to cover and hide the attachment member attached to the attachment recess, the cover body being attached to the exterior panel.

2. The sensor attachment structure according to claim 1, wherein a panel-side opening that exposes at least a part of the surrounding information sensor is formed in a depression direction bottom surface of the attachment recess.

3. The sensor attachment structure according to claim 2, wherein a cover-side opening that exposes at least a part of the surrounding information sensor is formed in a portion of the cover body that faces the panel-side opening.

4. The sensor attachment structure according to claim 1, wherein a corner hole that is a through-hole is formed in at least one corner of the attachment recess.

5. The sensor attachment structure according to claim 1, wherein:
one of the surrounding information sensor and the attachment recess has a locking claw protruding toward the other; and
the other of the surrounding information sensor and the attachment recess has a locking hole into which the locking claw is inserted and caught.

6. The sensor attachment structure according to claim 1, wherein the cover body is fastened to a depression direction bottom surface of the attachment recess by a cover clip protruding from a rear surface of the cover body.

7. The sensor attachment structure according to claim 4, wherein the corner hole spans a depression direction bottom surface of the attachment recess and a peripheral surface of the attachment recess.

8. A sensor attachment structure comprising:
an attachment recess formed by causing a part of an exterior panel of a vehicle to be depressed toward an inside of the vehicle;
a surrounding information sensor configured to detect surrounding information of the vehicle, at least a part of the surrounding information sensor being disposed further inside the vehicle than the attachment recess;
an attachment member configured to attach the surrounding information sensor to the exterior panel from an outside of the vehicle; and
a cover body configured to cover and hide the attachment member attached to the attachment recess, the cover body being attached to the exterior panel, wherein:
one of the surrounding information sensor and the attachment recess has a locking claw protruding toward the other; and
the other of the surrounding information sensor and the attachment recess has a locking hole into which the locking claw is inserted and caught.

9. The sensor attachment structure accordingly to claim 8, wherein a panel-side opening that exposes at least a part of the surrounding information sensor is formed in a depression direction bottom surface of the attachment recess.

10. The sensor attachment structure according to claim 9, wherein a cover-side opening that exposes at least a part of the surrounding information sensor is formed in a portion of the cover body that faces the panel-side opening.

11. The sensor attachment structure according to claim 8, wherein a corner hole that is a through-hole is formed in at least one corner of the attachment recess.

12. The sensor attachment structure according to claim 8, wherein the cover body is fastened to a depression direction bottom surface of the attachment recess by a cover clip protruding from a rear surface of the cover body.

13. The sensor attachment structure according to claim 11, wherein the corner hole spans a depression direction bottom surface of the attachment recess and a peripheral surface of the attachment recess.

14. A sensor attachment structure comprising:
an attachment recess formed by causing a part of an exterior panel of a vehicle to be depressed toward an inside of the vehicle;
a surrounding information sensor configured to detect surrounding information of the vehicle, at least a part of the surrounding information sensor being disposed further inside the vehicle than the attachment recess;
an attachment member configured to attach the surrounding information sensor to the exterior panel from an outside of the vehicle, the attachment recess including a depression direction bottom surface; and
a cover body configured to cover and hide the attachment member attached to the attachment recess, the cover body being attached to the exterior panel, the cover including rear surface and a cover clip protruding from the rear surface, the cover body fastened to the depression direction bottom surface of the attachment recess by the cover clip.

15. The sensor attachment structure according to claim 14, wherein a panel-side opening that exposes at least a part of the surrounding information sensor is formed in the depression direction bottom surface of the attachment recess.

16. The sensor attachment structure according to claim 15, wherein a cover-side opening that exposes at least a part of the surrounding information sensor is formed in a portion of the cover body that faces the panel-side opening.

17. The sensor attachment structure according to claim 14, wherein a corner hole that is a through-hole is formed in at least one corner of the attachment recess.

18. The sensor attachment structure according to claim 17, wherein the corner hole spans the depression direction bottom surface of the attachment recess and a peripheral surface of the attachment recess.

* * * * *